Oct. 7, 1941.  J. P. KOLEY  2,258,363
CENSER
Filed Jan. 19, 1940  2 Sheets-Sheet 1
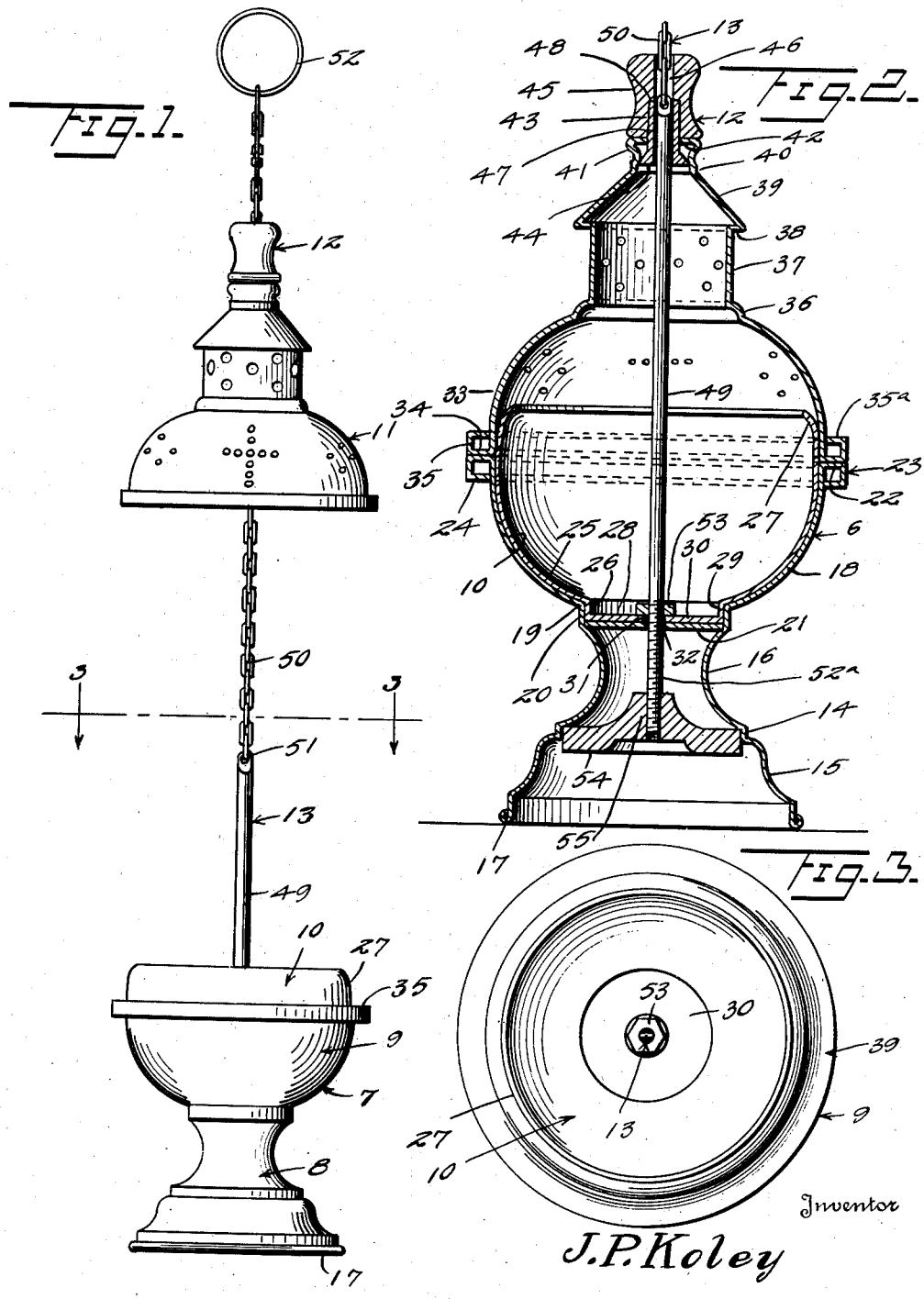
Inventor
J. P. Koley
By Kimmel & Crowell
Attorneys Oct. 7, 1941.  J. P. KOLEY  2,258,363
CENSER
Filed Jan. 19, 1940  2 Sheets-Sheet 2
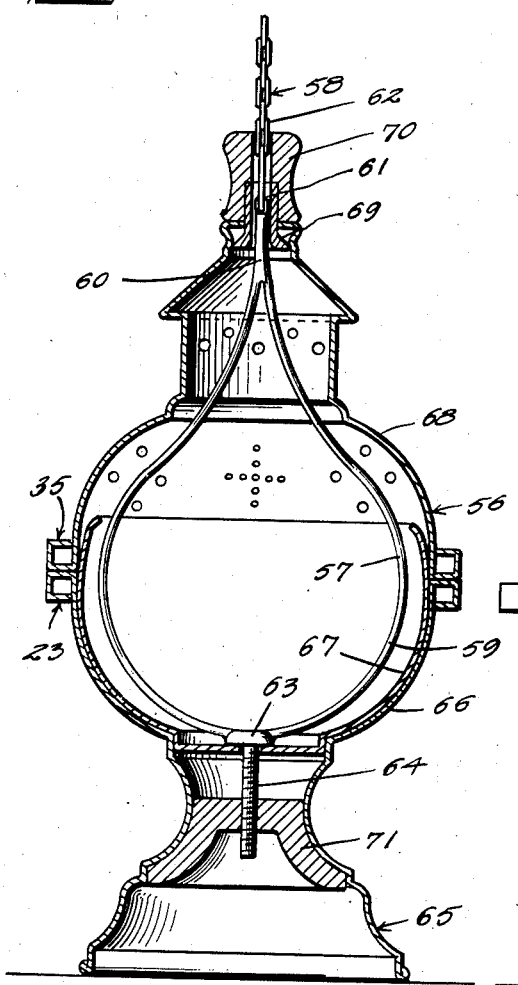
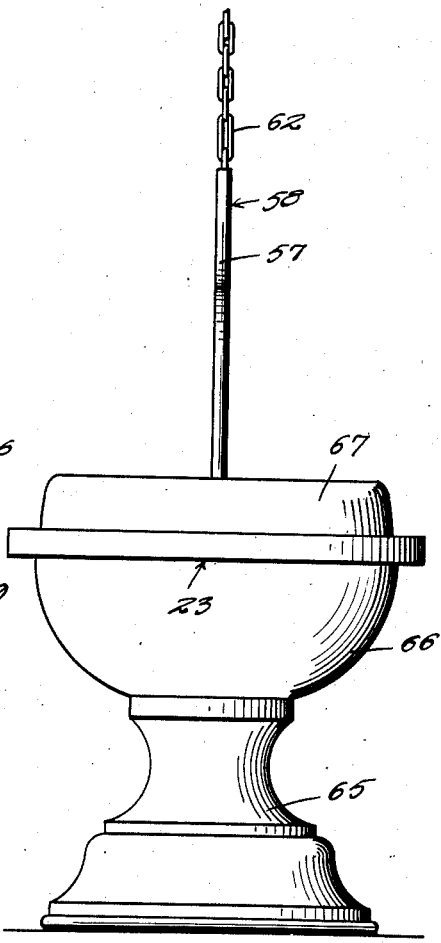
Inventor
J. P. Koley
By Kimmel & Crowell
Attorneys

Patented Oct. 7, 1941

2,258,363

UNITED STATES PATENT OFFICE 2,258,363

CENSER

Joseph P. Koley, Omaha, Nebr.

Application January 19, 1940, Serial No. 314,723

4 Claims. (Cl. 21—116)

This invention relates to a censer.

The invention aims to provide, in a manner as hereinafter set forth, a censer so constructed to overcome the necessity of employing a chain for the purpose of lifting its lid element from off its container element when access is desired to the latter.

The invention further aims to provide, in a manner as hereinafter set forth, a censer including a single chain for suspending or swinging it thereby overcoming the objection present from the entanglement of the chains of the set which form elements of censers now in general use.

The invention further aims to provide, in a manner as hereinafter set forth, a censer having a single suspension and lifting means for the lid, cover or top of its container element free of direct connection to and guided by said single suspension.

The invention further aims to provide, in a manner as hereinafter set forth, a censer including a single suspension and means whereby the lid, cover or top for the container element thereof may be lifted up and down on said suspension, the advantage of which is obvious since it overcomes the frequent entanglements of the suspensions or chains in the standard present-day censers.

The invention further aims to provide, in a manner as hereinafter set forth, a censer constructed in a manner whereby the lid, cover or top for the container element thereof may be elevated and lowered from its upper end by the hand guided by a single suspension disposed axially of the body of the censer.

The invention further aims to provide, in a manner as hereinafter set forth, a censer whereby a set of suspension chains and a lid lifting chain are dispensed with.

The invention further aims to provide, in a manner as hereinafter set forth, a censer including a single suspension anchored at its inner end within the body of the censer, extending through the shiftable container lid of the latter and constituting a guide for the lid on the shifting of the latter.

The invention further aims to provide, in a manner as hereinafter set forth, a censer including guided means for conveniently and expeditiously lifting the container lid by hand from off of the container when occasion requires.

The invention further aims to provide, in a manner as hereinafter set forth, a censer free of a set of suspension chains therefor and including a shiftable lid for its container and with the lid being free of a set of guides.

The invention further aims to provide, in a manner as hereinafter set forth, a censer having a single suspension, a shiftable lid, cover or top for a container element and means slidably mounted on the single suspension for lifting the lid to provide for access to the container element.

The invention further aims to provide, in a manner as hereinafter set forth, a censer including a container element, a shiftable lid element for the container element, a single suspension extending into and coupled with the container element and on which the lid element travels when the latter is shifted to and from closing relation with respect to the container element, and means coupled to the lid element and free of direct connection to the suspension for opening and closing the lid element.

The invention further aims to provide, in a manner as hereinafter set forth, a censer which is simple in its construction and arrangement, strong, durable, compact, distinctive and pleasing in appearance, thoroughly efficient for the purpose intended thereby, capable of being conveniently and expeditiously opened for access thereto when occasion requires, readily assembled, balanced, and comparatively inexpensive to manufacture.

Embodying the aims aforesaid and others which may hereinafter appear, the invention consists of the novel construction, combination and arrangement of parts as will be more specifically referred to and illustrated in the accompanying drawings, wherein are shown embodiments of the invention, but it is to be understood that changes, variations and modifications may be resorted to which fall within the scope of the invention as claimed.

In the drawings:

Figure 1 is an exploded view in side elevation of a censer in accordance with this invention, Figure 2 is a vertical sectional view of the censer shown in Figure 1 when in a non-exploded position, Figure 3 is a section on line 3—3 Figure 1, Figure 4 is a vertical sectional view of a modified form of censer in accordance with this invention, and Figure 5 is a side elevation of the body part and suspension of the form of censer shown by Figure 4.

With reference to Figures 1, 2 and 3, the censer generally indicated at 6 includes a body part 7 providing a base 8 and a bowl-like holder 9, an open top container 10 mounted in and extended from the holder 9, a lid or cover 11 for the container 10, a grip 12 for moving the lid relative to the container, and a single suspension 13 extending through the grip, container, holder and into and anchored to the base. The latter and the holder are struck from a single piece of any suitable metallic material of the desired thickness.

The base 8 is tubular and it includes a vertically disposed annular intermediate part 14, a tapered lower part 15 merging at its upper end into the lower edge of the part 14 and an oppositely flared upper part 16 merging at its lower end into the top edge of the part 14. The lower part 15 is formed with a reinforcing bead 17 at its bottom edge. The holder 9 is hollow and it includes a receiver part 18 of semi-spherical contour in cross section, which is formed with an axial opening 19 in its bottom. The edge of the opening 19 merges into the top edge of a depending annular part 20 which merges into the top edge of the part 16 of base 8. Arranged within the part 20, as well as abutting the inner face of the latter and supported by the part 16 of base 8 is an axially apertured disc 21. The upper end of the part 18 merges into the top wall 22 of a laterally extended inwardly opening channel shaped endless flange 23 having its bottom wall 24 abutting the outer periphery of the part 18. The flange 23 constitutes a support or seat for a purpose to be referred to.

The container 10 is formed of suitable metallic material, it is mounted in the receiver part 18 of holder 9, extends in part 20, seats on disc 21 and extends above the wall 22 of the flange 23. The container 10 includes a body part 25 open at its top and at its bottom. The open top is of greater diameter than its open bottom. The latter is indicated at 26. The body part 25 is of spherical contour in plan and in vertical section it is of a contour greater than a half sphere, but less than a complete sphere. That portion of the container 10 which extends above the wall 22 of flange 23 as indicated at 27 is slightly curved inwardly relative to said wall and is resilient. The container 10 includes a circular depending pan-like part 28 having the upper end of its rim 29 merging into the edge of the bottom opening 26 of body part 25. The pan-like part 28 has its rim 29 encompassed by the annular part 20 and its bottom 30 seated on the disc 21. The said bottom 30 is formed with an axial opening 31 which aligns with the axial opening 32 of the disc 21.

The lid or cover 11 for container 10 is hollow and it includes a lower part 33 of dome-shape cross section formed with spaced apertures and terminating at its lower end in the lower wall 34 of an endless laterally extending flange 35 of inwardly opening channel form. The upper wall 35ª of flange 35 bears against the outer periphery of the part 33. The part 33 is open at its top and the edge of such opening merges into an annular part 36 of substantially convexo-concave contour in vertical section. The top of part 36 merges into a vertically disposed cylindrical part 37 provided with spaced apertures and at its upper end with a flat laterally extending annular flange 38. The latter at its outer edge terminates into the lower end of a frusto-conical part 39, which at its top merges into a vertically disposed annular part 40 terminating in the lower end of an oppositely flared head part 41 provided at its upper end with a flat inwardly extending annular flange 42. Mounted within the head part 41 and extending upwardly through flange 42 is a coupler 43 having an enlarged tapered inner portion 44, which bears against the inner face of said head part. The coupler 43 is tubular, open at each end and it is to extend the desired distance above the flange 42.

There is correlated with the lid 11 the hand or finger grip 12. The latter is formed from a body 45 of any suitable non-conducting material of the desired length and diameter. The body 45 has an axial opening formed of two different diameters as indicated at 46, 47. The junction of the two diameters form the grip 12 intermediate its ends with an internal shoulder 48. The portion of smallest diameter 46 of the axial opening in body 45 is arranged outwardly of the shoulder 48. The latter in connection with the portion 47 of largest diameter of the opening in body 45 coacts to form a socket in which the coupler 43 extends and is secured. The opening or passage formed by the coupler 43 registers with the inner end of the portion 46 of smallest diameter of the opening in the grip 12.

The suspension 13 is formed of a rigid inner section 49 of bar like form, a flexible outer section 50 in the form of a chain connected at its inner end to the outer end of section 49, as at 51 and a finger or thumb ring 52 at the outer end of section 50. The inner portion of the section 49 is peripherally threaded, as at 52ª and carries a stop nut 53. The section 49, when the lid 11 is in the position as shown by Figure 2 extends down through the coupler 43, down through and axially of the lid 11, down through the openings 32, 31 and into the upper part 16 of base 8. The stop nut 53 is arranged on section 49 above the bottom 30 of the pan-like part 28. When the lid 11 is shifted to open the container 10, when occasion requires it is slid upwardly on and guided by the outer section 50 of the suspension 13. The said outer section 50 when the lid 11 is in closed position relative to container 10 extends into the upper end of the grip 12.

The body part or portion 7 and container 10 are releasably clamped together by the correlation of nut 53, bottom 30 of pan-like part 29 and suspension section 49 in connection with a combined balance weight and nut 54 arranged within and abutting the inner face of the base 8. The weight 54 is formed with an axially arranged threaded opening 55. The threaded inner section 49 of the suspension 13 has threaded engagement with the wall of the opening 55, and said section 49 is adjusted relative to weight 54 to an extent to provide for clamping body part 7 and container 10 together. The threaded engagement of section 49 of the suspension 13 anchors the inner end of the latter to the said body part 7.

The suspension 13 is disposed axially of the base 8, holder 9, container 10 and lid 11. When it is desired to lift the lid to open the container 10, the grip is grasped and slid upwardly on the section 50 of the suspension carrying the lid therewith. The said section 50 constitutes a guide for the lid 11 when opening and closing the container.

The modified form of censer 56 shown by Figures 4 and 5, corresponds substantially in structural arrangement to that of the censer 6, with this exception that the inner section 57 of the suspension 58 (Figure 4) is of a different form that the form of the inner section 49 of the suspension 13. The said inner section 57 is in the form of a skeleton rigid frame 59 corresponding substantially in contour to the shape of the lengthwise section of the body of a pear. The top of frame 59 has an integral extension 60 which is connected at its upper end, as at 61, to the inner end of the flexible outer section 62 of the suspension 58. The bottom of frame 59, centrally thereof has formed integral therewith a stop 63 functioning for the same purpose as the stop nut 53. The stop 63 has formed integral therewith and depending therefrom a peripherally threaded rod 64 which function for the same purpose as the threaded portion of the section 49 of the suspension 13. In Figures 4 and 5 the base, holder, container, lid, coupler and grip are indicated at 65, 66, 67, 68, 69, 70 respectively. The combined balance weight and nut employed in censer 56 is indicated at 71. Otherwise than that as stated the construction of the censer 56 will correspond to the construction of the censer 6.

The form of inner section 57 of the suspension 56 permits the charcoal to lie flat in container 67. The inner section 49 of the suspension 13 will have the charcoal bear against it when arranged in container 10.

What I claim is:

1. A censer comprising a hollow base, an upwardly opening body fixed to said base, an inner receptacle having its lower portion bearing against the inner face of and having the upper portion thereof extending above said body, a rigid substantially pear-shaped frame within said inner receptacle and having a portion thereof extending thereabove, a threaded stem-like part secured to the lower inner portion of said frame and extending downwardly through said receptacle and within said base, a combined nut and weight correlated with said base and threaded onto said stem part for holding said frame, receptacle and body together, a lid engageable about the extended portion of said receptacle, an upstanding axially apertured handle carried by said lid, and a flexible suspension member fixed at one end to said frame and extended through said handle, said suspension member constituting a guide for the lid and handle to axially guide the lid upon upward movement thereof from said body.

2. A censer comprising a hollow base, an upwardly opening body fixed to and communicating with said base, an inner receptacle having its lower portion bearing against the inner face of and having the upper portion thereof extending above said body, said receptacle having the central portion of its bottom bearing against the inner face of the base, means for connecting said base, body and receptacle in assembled relation, said means including a combined weight and nut arranged in the base and a threaded coupling part correlating with said combined weight and nut and extending through the bottom of the receptacle, a lid engageable about the extended portion of said receptacle, an upstanding axially apertured handle carried by the lid, said means also including a rigid part extending upwardly through the lid and terminating in the aperture of the handle, and a flexible suspension fixed at one end to said rigid part and extending through said handle, said suspension constituting a guide for the lid and the handle to axially guide the lid upon upward movement thereof from said body.

3. A censer comprising a hollow base, an upwardly opening body fixed to said base, an inner receptacle having its lower portion bearing against the inner face of and having the upper portion thereof extending above said body, a rigid straight suspension member within said inner receptacle and having a portion thereof extending thereabove, a threaded stem-like part integral with the lower inner portion of said suspension member and extending downwardly through said receptacle and within said base, a combined nut and weight correlated with said base and threaded onto said stem part for holding said suspension member, receptacle and body together, a lid engageable about the extended portion of said receptacle, an upstanding axially apertured handle carried by said lid, and a flexible suspension member fixed at one end to said rigid suspension member and extended through said handle, said flexible suspension member constituting a guide for the lid and handle to axially guide the lid upon upward movement thereof from said body.

4. A censer comprising a hollow base, an upwardly opening body fixed to and communicating with said base, an inner receptacle having its lower portion bearing against the inner face of and having the upper portion thereof extending above said body, said receptacle having the central portion of its bottom bearing against the inner face of the base, means for connecting said base, body and receptacle in assembled relation, said means including a combined weight and nut arranged in the base and a threaded coupling part correlating with said combined weight and nut and extending through the bottom of the receptacle, a lid engageable about the extended portion of said receptacle, an upstanding axially apertured handle carried by the lid, said means also including a straight axially disposed rigid part integral with said coupling part and extending upwardly through the lid and terminating in the aperture of the handle, and a flexible suspension fixed at one end to said rigid part and extending through said handle, said suspension constituting a guide for the lid and the handle to axially guide the lid upon upward movement thereof from said body.

JOSEPH P. KOLEY.